United States Patent [19]

Williams

[11] 4,084,714
[45] Apr. 18, 1978

[54] POULTRY-HANDLING SYSTEM

[76] Inventor: Melvin L. Williams, 28301 Highway S., Cloverdale, Calif. 95425

[21] Appl. No.: 730,981

[22] Filed: Oct. 8, 1976

[51] Int. Cl.² .............................................. B60P 1/00
[52] U.S. Cl. ..................................... 214/515; 119/17; 214/85; 119/12
[58] Field of Search ...................... 119/12, 17; 214/85, 214/515; 49/37

[56] References Cited

U.S. PATENT DOCUMENTS

| | | | |
|---|---|---|---|
| 1,458,736 | 6/1923 | Stewart | 119/17 |
| 2,650,727 | 9/1953 | Martin | 214/85 |
| 3,147,869 | 9/1964 | Fujioka et al. | 214/85 |
| 3,895,727 | 7/1975 | Rucker | 119/17 X |

Primary Examiner—Hugh R. Chamblee
Attorney, Agent, or Firm—Berman, Aisenberg & Platt

[57] ABSTRACT

A plurality of wheeled multi-compartmented poultry containers or carts designed to be utilized in conjunction with a fifth wheel trailer which may be hauled by either a pickup truck or a tractor. The side frames of the trailer are comprised of hinged U-shaped rails or channels which serve to guide the wheeled poultry containers onto and off of the trailer bed. The system features the ability to easily manipulate the wheeled carts into the poultry house, load same with poultry, and then easily roll the carts back onto the trailer for transporting, without the need for auxiliary loading equipment.

4 Claims, 11 Drawing Figures

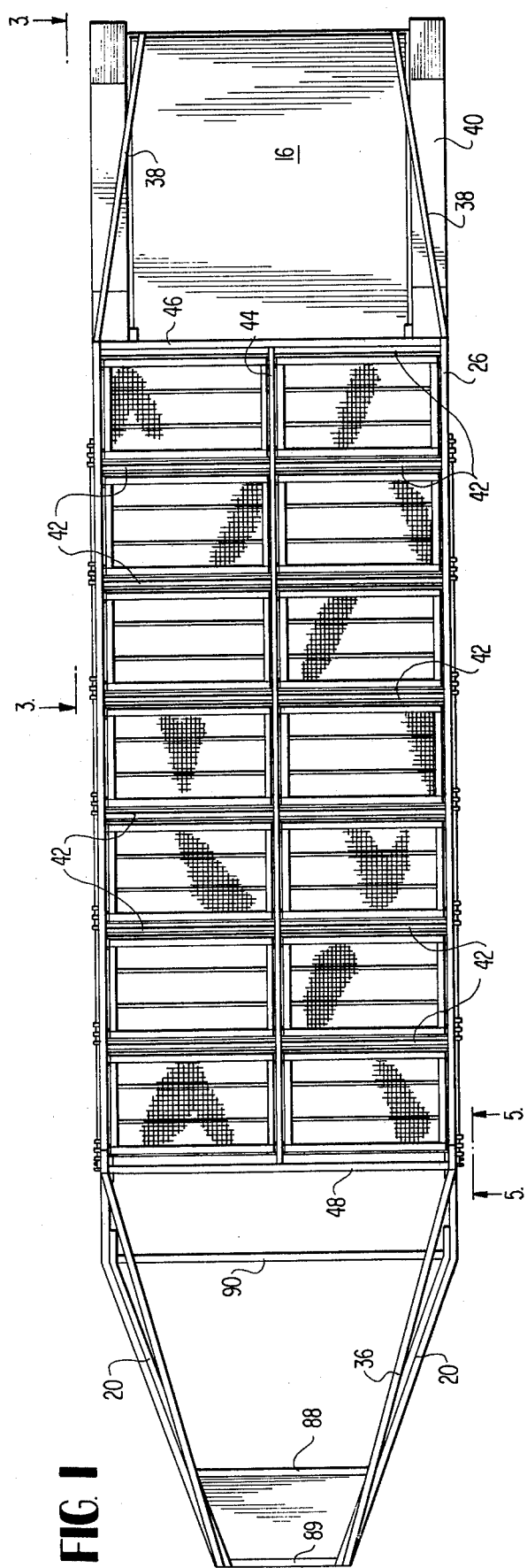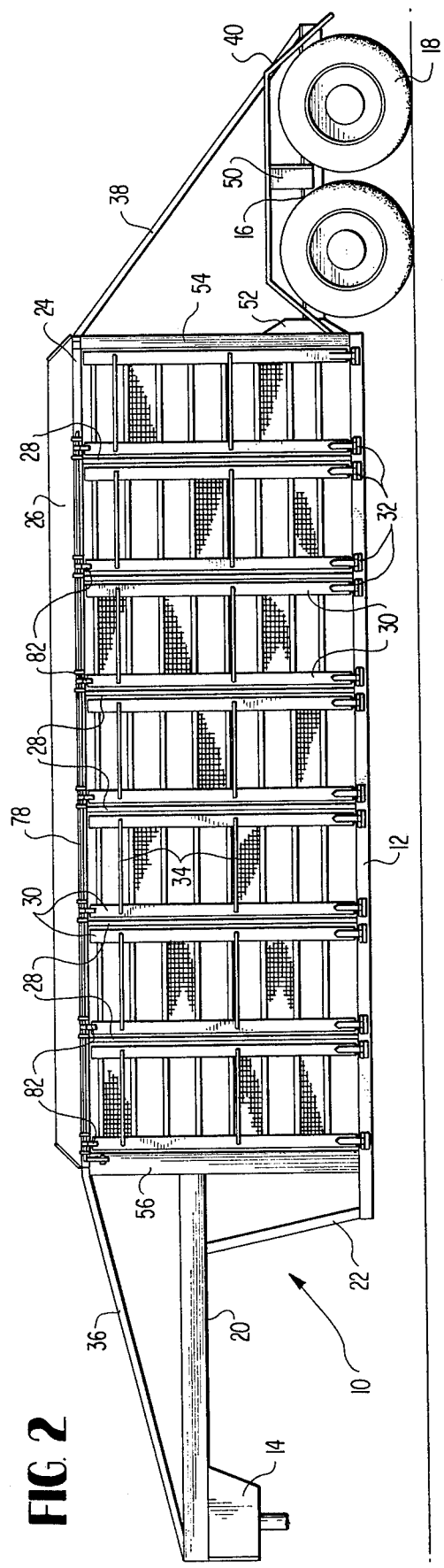

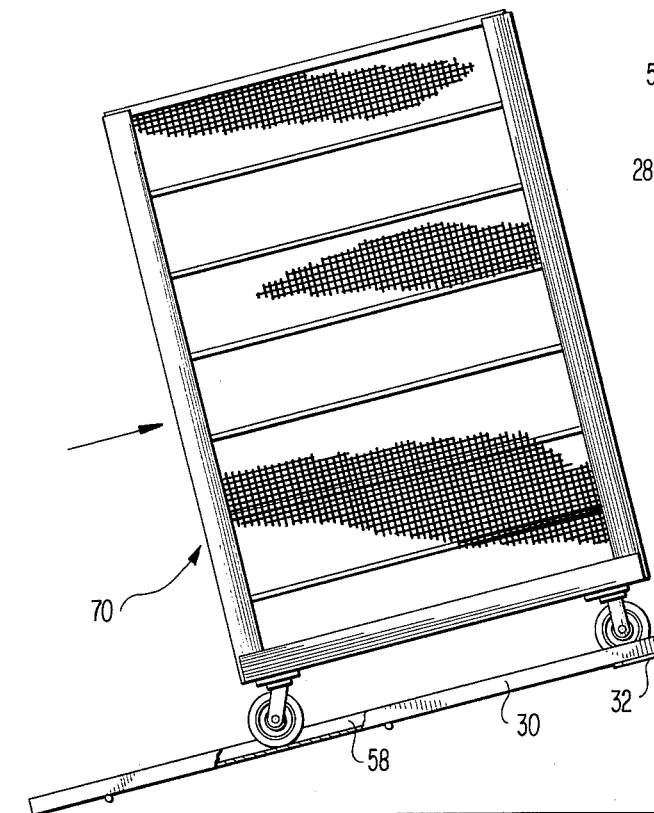
FIG. 4
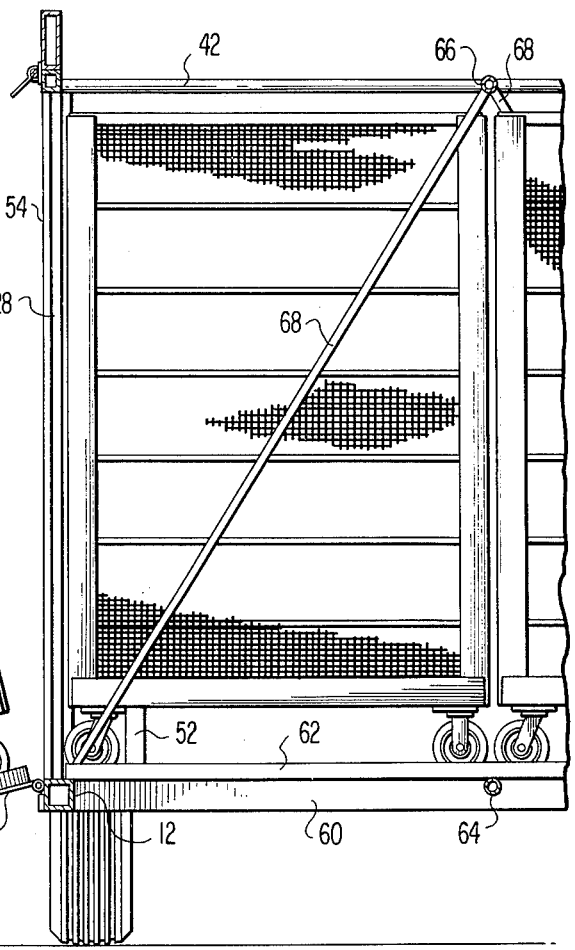
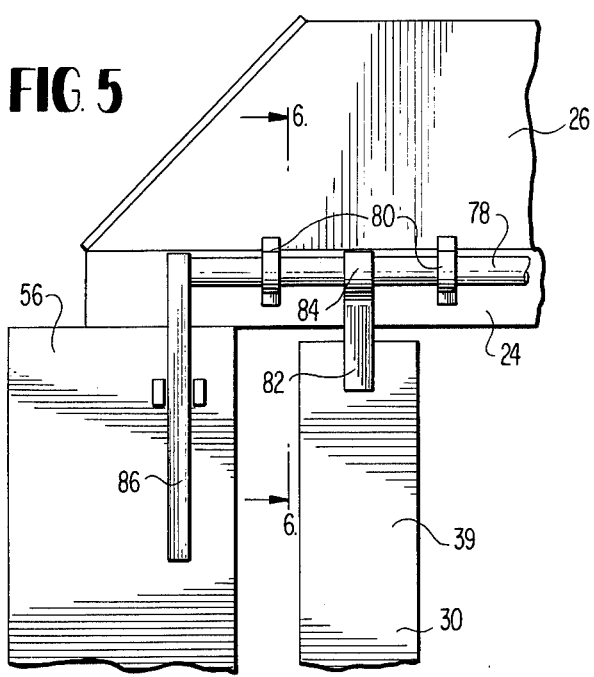
FIG. 5
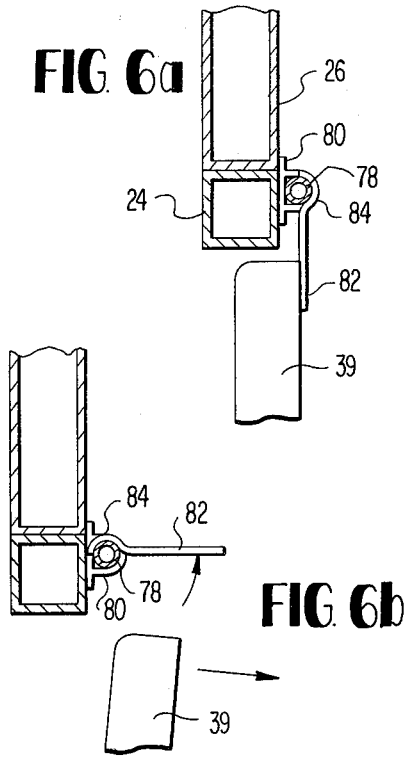
FIG. 6a
FIG. 6b

POULTRY-HANDLING SYSTEM

BACKGROUND OF THE INVENTION

1. Field of the Invention

This invention is related to poultry handling systems and, more particularly, is directed towards a system and apparatus for permitting the easy loading and transportation of poultry from the poultry house to another location.

2. Description of the Prior Art

The prior art suggests many different forms of poultry trailers, poultry handling systems, and the like. U.S. Pat. No. 3,633,963, for example, illustrates a trailer for chickens which includes a plurality of individually openable compartments for storing the chickens therein. Other prior art United States patents of which I am aware which describe different types of poultry trailers include: 3,476,084; 3,173,564; 2,099,774; and 3,940,174.

Each of the structures described in the above-cited references are of limited usefulness, however, inasmuch as they are directed solely towards a means for transporting the poultry from one location to another. That is to say, such patents do not suggest or disclose any convenient means for loading the trailers or trucks therein described, other than simply by manually placing the individual birds one-by-one into the poultry compartments, a task which requires not an inconsiderable amount of time when the distance between a parked trailer and the poultry house is large.

Several other patents of which I am aware suggest solutions to the poultry handling problems above-described in setting forth systems and devices for facilitating and thereby speeding up the unloading and loading of poultry on the trailer. Exemplary of this class of United States patents includes: 3,621,818; 3,706,300; and 3,916,835.

The above-cited patent to Johnston et al (3,621,818) merely sets forth a trailer which includes a plurality of chicken coops or cages which may be tilted while on the trailer to facilitate the unloading of the fowl contained in the coops. The second-cited Reynolds patent (3,706,300) is directed towards a rather complex conveyor belt type of system for loading the poultry directly from the poultry house onto the truck, while the last-named Wessinger patent (3,916,835) discloses an air-pressure operated poultry transfer means which literally sucks the poultry onto or off of a compartmented trailer or truck.

While each of the devices described in the above-cited patents may be advantageous in certain situations, overall they suffer from several deficiencies, not the least of which includes their high cost, undue complexity, low reliability, and general lack of efficiency. The conveyor belt and air-pressure operated systems, in particular, are prone to mechanical failure and concomitant breakdown time which reduces their attractiveness as an efficiency increasing system for handling poultry. Further, the length of the conveyors is indeed limited such that the truck or trailer being loaded or unloaded must of necessity be able to park in close proximity to the poultry house from or to which the chickens or other poultry are to be transferred. Electrical power is required to operate the power-assist devices, which adds further to the cost, complexity, and limits the universal usefulness of such devices in remote areas.

It is therefore apparent that a need exists for a simplified, efficient, and generally improved manner of handling poultry from the poultry house to the trailer for transportation to distant points.

Other United States patents in this same general art area of which I am aware include: 1,374,120; 2,474,932; and 3,892,201.

OBJECTS AND SUMMARY OF THE INVENTION

It is therefore a primary object of the present invention to provide a novel and unique system for handling poultry which overcomes all of the disadvantages noted above with respect to prior art devices and systems.

Another object of the present invention is to provide a poultry handling system which is an improvement over prior art systems, is easier to manufacture, has a simplified operation, and is economical and reliable.

A further object of the present invention is to provide a unique method and apparatus for handling and transporting poultry which is efficient, reliable, and does not require the utilization of special power machinery or the like.

The foregoing and other objects are attained in accordance with one aspect of the present invention through the provision of a poultry handling system which comprises wheeled means comprising a plurality of compartments for containing poultry, and means for transporting a plurality of said wheeled means. The transporting means more particularly includes movable side frame means for providing a loading ramp for the plurality of wheeled means, the movable side frame means more particularly comprising a plurality of elongated guide members which are adjustably mounted to the frame of the transporting means for selective positioning thereof. The transporting means further includes means for latching the plurality of elongated guide members in a substantially vertical position.

In accordance with other aspects of the present invention, the latching means comprises an actuating shaft positioned along an upper frame member of the transporting means, handle means for rotating the actuating shaft, and a plurality of retainer members connected to said shaft at spaced locations. Each of the guide members comprises a substantially U-shaped channel which is hingedly mounted at its base to a lower longitudinal frame member of the transporting means, the upper portion of each guide member being retained in a vertical position by the spaced retainer members which, when released, allow the U-shaped channel members to swing outwardly and downwardly to contact the ground surface to permit the wheeled means to be guided onto the transporting means. The transporting means more particularly includes a plurality of channel rails transversely positioned across the bed thereof at spaced locations which correspond to the positions of the guide members for receiving wheeled means after loading via the guide means. Preferably, the adjustably mounted guide means are positioned along both longitudinal sides of the transporting means such that the latter may be loaded with wheeled containers from both sides.

In accordance with yet other aspects of the present invention, the wheeled means comprises a main frame having wheels positioned at the four lower corners thereof, and a plurality of vertically stacked individually screened poultry compartments each of which include an individually hinged door. In accordance with other aspects of the present invention, the transporting means comprises a trailer having built-in ramp means for loading and unloading the wheeled means, the trailer including a forwardly positioned fifth wheel hitch for mounting to either a pickup truck or tractor, and a rearwardly positioned horizontal platform means for transporting an auxiliary piece of equipment, the wheels of the trailer being positioned below said horizontal platform means.

BRIEF DESCRIPTION OF THE DRAWINGS

The foregoing and other objects, aspects, uses and advantages of the present invention will be more fully appreciated as the same becomes better understood from the following detailed descriptiom thereof when considered in connection with the accompanying drawings, in which:

FIG. 1 is a top plan view illustrating a preferred embodiment of a poultry handling system in accordance with the present invention;

FIG. 2 is a side view illustrating the preferred embodiment shown in FIG. 1;

FIG. 4 is a sectional view of the preferred embodiment illustrated in FIG. 3 and taken along line 4—4 thereof;

FIG. 5 is an enlarged view illustrating a preferred embodiment latching mechanism of the present invention taken along line 5—5 of FIG. 1;

FIGS. 6a and 6b illustrate the method of operation of a preferred embodiment latching mechanism illustrated in FIG. 5 and taken along line 6—6 thereof;

DETAILED DESCRIPTION OF THE PREFERRED EMBODIMENT

Figure 3:
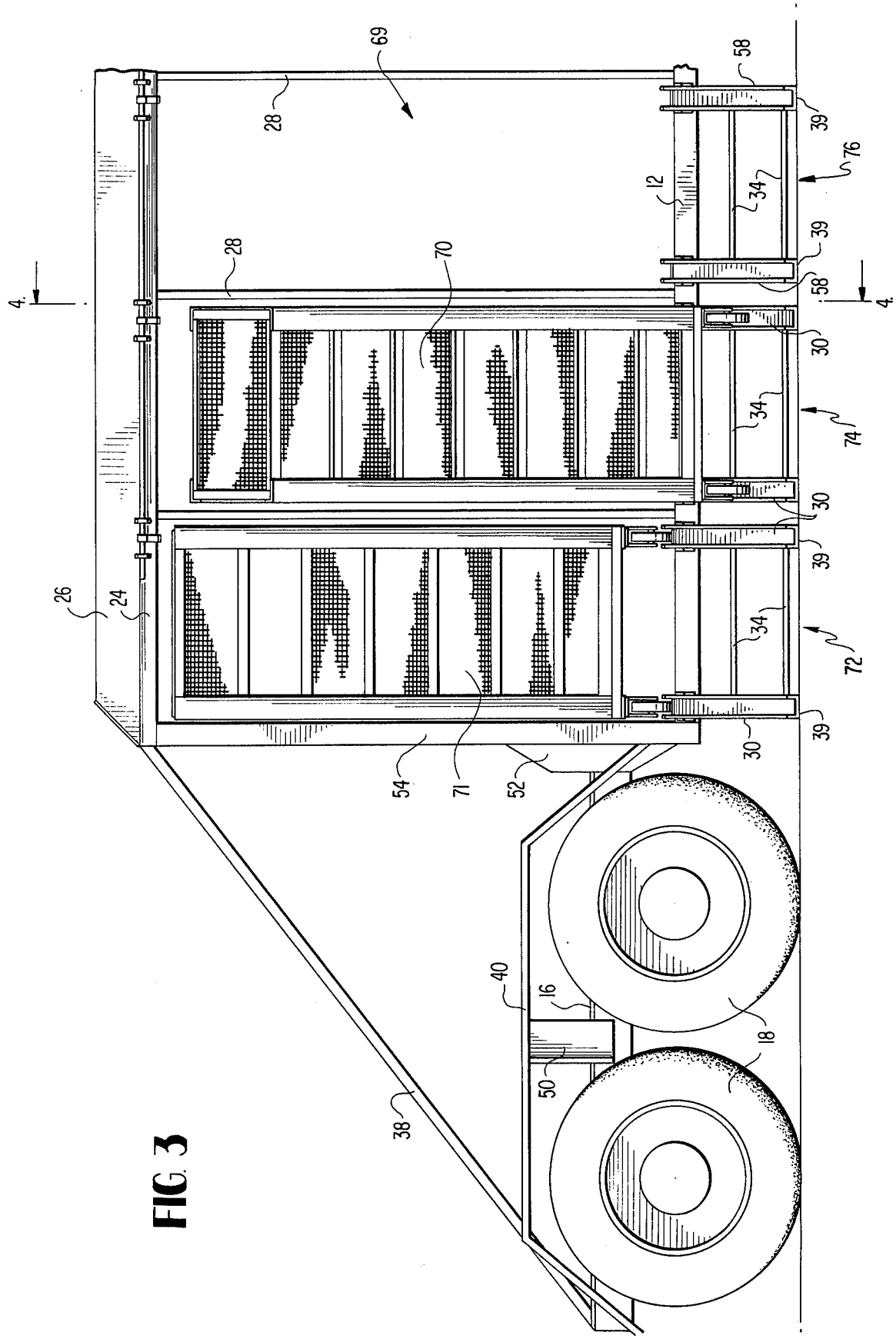
FIG. 3 is an enlarged view of the preferred embodiment of the present invention during a loading operation and taken along line 3—3 of FIG. 1.
Figure 7:
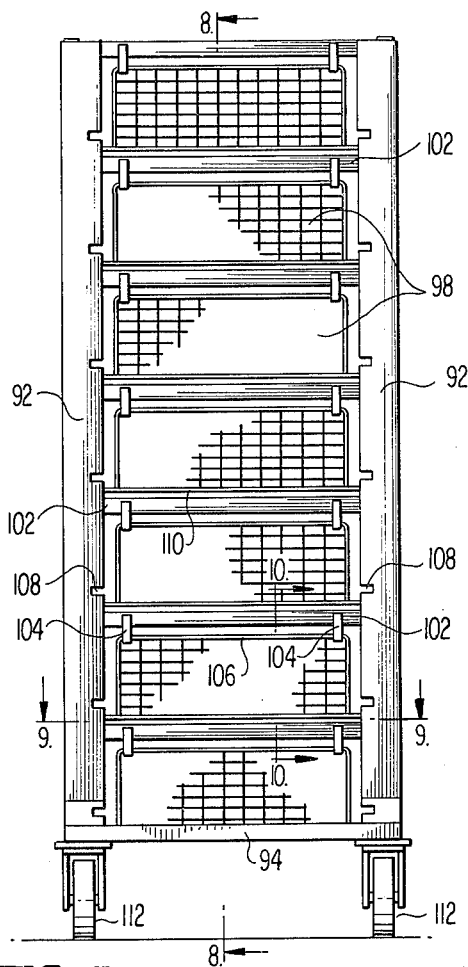
FIG. 7 is a front, plan view of a preferred embodiment wheeled poultry cage in accordance with the teachings of the present invention.
Figure 8:
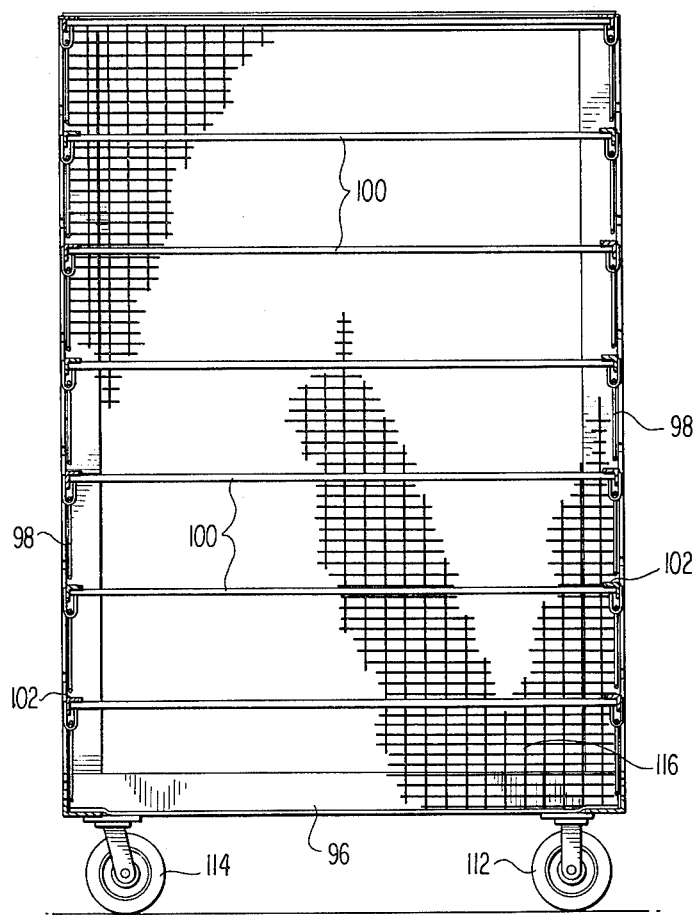
FIG. 8 is a cross-sectional view of the preferred embodiment illustrated in FIG. 7 and taken along line 8—8 thereof.
Figure 9:
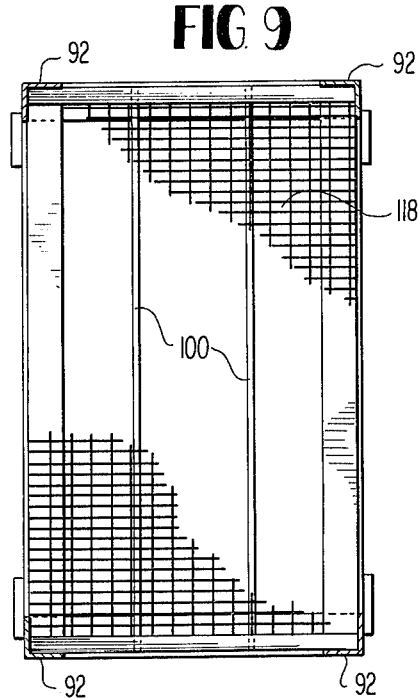
FIG. 9 is a sectional view illustrating the preferred embodiment of FIG. 7 and taken along line 9—9 thereof.
Figure 10:
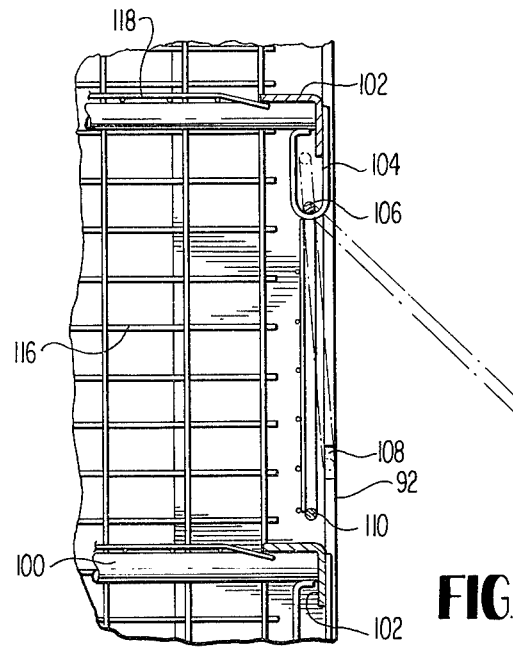
FIG. 10 is an enlarged view illustrating the door opening latch of the preferred embodiment illustrated in FIG. 7 of the present invention and taken along line 10—10 thereof.

Referring now to the drawings, wherein like reference numerals represent identical or corresponding parts throughout the several views, and more particularly to FIGS. 1 and 2 thereof, there is illustrated in top and side plan views, respectively, a preferred embodiment of the poultry handling system of the present invention in which the trailer portion thereof is indicated generally by the reference numeral 10.

The trailer is of the fifth wheel type and includes a forwardly disposed fifth wheel hitch 14 for mounting on the bed of a pickup truck, tractor, or the like, in a conventional fashion. The fifth wheel hitch assembly 14 extends downwardly from a pair of horizontal brace members 20, preferably comprised of a pair of adjacent channel irons, and a forwardly disposed front brace 89. A pair of intermediate horizontal brace members 88 and 90 are also provided, as is a diagonally disposed fifth wheel support rod 36 and a side support plate 22.

The bed of the trailer 10 is comprised of a pair of lower longitudinal frame members 12 which are disposed along both sides of the trailer. A pair of upper longitudinal frame members 24 extend substantially parallel to the lower longitudinal frame members 12, and on top of the upper members 24 are positioned a pair of parallel longitudinal support members 26.

The forward end of the trailer frame is comprised of a pair of vertical front corner posts 56, and an upper transverse post 48 connecting the top portions thereof. Similarly, a rear upper transverse post 46 connects the longitudinal supports 26, while vertical rear end posts or frames 54 connect supports 24 and 12 at the rear corners of the trailer.

As seen in FIG. 1, a central, longitudinal support rod 44 connects the midpoint of transverse posts 46 and 48, while a plurality of transverse frame members 42 are positioned between upper longitudinal frame members 24.

Extending between and rigidly attached to upper and lower longitudinal frame members 24 and 12 are a plurality of regularly spaced vertical support rods 28 positioned on both sides of trailer 10. Between successive vertical support rods 28 are positioned a pair of movable, normally vertically oriented side channels or guide members 30 which are individually attached at the lower portions thereof to the lower longitudinal frame member 12 by a plurality of individual hinges 32. Adjacent pairs of vertical loading side channels 30 are preferably braced to one another by at least two cross bar linkages 34.

Extending rearwardly from the vertical rear end post or frame 54 of trailer 10 is a substantially horizontal rear platform or bed 16 which may be utilized for carrying a fork lift or similar piece of auxiliary equipment. The rear platform 16 is supported with the aid of a brace 52 and a pair of support rods 38 which extend downwardly from the upper longitudinal frame members 24. A pair of flanged supports 50 extend upwardly from platform 16 for supporting a pair of wheel splash guards 40, the wheels 18 of the trailer 10 being disposed below platform 16.

Referring now to FIGS. 3 and 4, the trailer 10 is seen to include upper and lower central longitudinally extending support posts or rods 66 and 64, respectively. Extending diagonally between the lower portion of vertical side support rods 28 and the central upper longitudinal rod 66 are a plurality of spaced diagonal support members 68 which define, between adjacent positions thereof, a plurality of cart-receiving compartments indicated generally by reference numeral 69 in FIG. 3.

Extending transversely between parallel lower side frame members 12 are a plurality of cart-support channels 62 which are spaced at locations which correspond to the spacing of vertical loading side channels 30. At the rear portion of the trailer 10 is included a lower horizontal frame support member indicated by reference numeral 60 in FIG. 4.

As clearly seen in FIG. 3, the compartments 69 are designed to house a plurality of poultry transport carts which are indicated generally by reference numeral 70. The vertical loading side channels 30 are shown in FIG. 3 in their released positions, their top ends 39 resting on the ground surface.

It is seen that, in the position illustrated in FIG. 3, two adjacent channels 30 form a pair of parallel guideways 58 along which the individual wheeled carts 70 may be easily moved. The loading channels 30 form, in essence, ramps via which the wheeled compartments 70 may be easily loaded and unloaded from the trailer 10.

Reference numeral 72 in FIG. 3 indicates generally a wheeled cart 71 in its fully loaded position on trailer 10, while reference numeral 74 indicates generally a wheeled cart 70 being positioned on the ramp formed by inclined channel members 30, and reference numeral 76 indicates generally an empty compartment 69 in trailer 10. It may be appreciated that the cart support channels 62, which run transversely between the lower longitudinal support frames 12, are colinear with respective channels 30 so as to receive the wheels of the carts 70 when loaded.

Referring now to FIGS. 5 and 6, a preferred embodiment of the latch means for the vertical loading side channels 30 is illustrated and will now be explained. The latch means comprises a rotatable rod actuator 78 which extends longitudinally down the length of the upper longitudinal frame member 24, as seen in FIG. 2. The rod actuator 78 is maintained in position by a series of U-shaped mounting brackets 80 which are fastened to longitudinal supports 24 and 26, as illustrated in FIGS. 5 and 6. Mounted at regularly spaced locations along rod 78 are a plurality of latch members 82 which are comprised of longitudinal bars having arcuate ends 84 for fastening to and rotation with rod 78. At one end of rod 78 is positioned a handle 86 which may be manually rotated from the position shown in FIGS. 5 and 6a wherein the latch members 82 are retaining the top portions 39 of vertical guide channels 30 in an upright position, to an extended horizontal position (not shown) wherein the rod 78 causes the latch members 82 to extend horizontally as illustrated in FIG. 6b whereby the top portion 39 of the vertical guide channels 30 will be released so as to rotate about hinges 32 (FIG. 2) to the position illustrated in FIGS. 3 and 4 so as to act as ramps. It is seen from FIG. 2 that the latch members 82 need be spaced only so as to latch every other vertical guide channel 30 as a result of the linkage bars 34 which interconnect successive pairs of guide channels 30. Obviously, individual latch means could be provided for each pair of adjacent channels 30, in lieu of the master rod actuator 78 illustrated.

Referring now to FIGS. 7 through 10, the details of construction of the wheeled poultry compartments is there illustrated and will now be explained in greater detail. The individual compartments 70 are seen to be comprised of four substantially parallel L-shaped corner vertical post members 92 which are interconnected by front and rear bottom support members 94 and side bottom support members 96. The wheeled poultry containers 70 are shown as comprising a plurality of vertically stacked and individually screened poultry compartments, which are equal to seven in number in the illustrated embodiment, each of which includes two individual screened doors 98 opening on both ends thereof. Each of the seven levels are separated from adjacent levels by a pair of parallel longitudinal support and divider bars 100. Connected between the four corner vertical posts 92 at the front and rear portions of the wheeled containers 70 are a plurality of transverse frame members 102 from which downwardly depend a pair of hinges 104 for each screened door 98. The hinges 104 comprise a generally U-shaped member within which the upper wire frame 106 of door 98 is adjustably positioned. The inner peripheral edges of the vertical posts 92 are provided with a plurality of slots 108 through which the lower wire frames 110 of doors 98 may be positioned after the door 98 is raised within hinges 104. The action is most clearly illustrated in FIG. 10 which respectively shows in solid and dotted outline the closed and opening positions of the door 98. The door 98 is opened by simply raising same and passing the lower wire frame 110 thereof through aperture 108.

The sides of the wheeled compartments 70 are enclosed by a standard wire mesh 116, which a similar wire mesh 118 separates the several vertical compartments. A pair of stationary forward wheels 112 are provided for each cart, while a pair of pivotable rear wheels 114 are also provided to add maneuverability to the cart.

In use, the wheeled carts may be easily transported into the poultry house, loaded with the birds, and then rolled back out onto the trailer via the lowered side channels or ramps for transportation to desired locations. Such a system of handling poultry saves many man hours and minimizes shrinkage and bruising of the birds, which resulted from the undue amount of handling required by prior art systems and modes of transport. While the preferred embodiment illustrated in FIG. 1 accommodates fourteen wheeled poultry carts which, when fully loaded from both sides of trailer 10, can transport 3,000 pullets or 2,500 hens, the total capacity may be made either larger or smaller as desired.

Obviously, numerous modifications and variations of the present invention are possible in light of the above teachings. It is therefore to be understood that within the scope of the appended claims, the invention may be practiced otherwise than as specifically described herein.

I claim as my invention:

1. A poultry-handling system, which comprises:
   wheeled means comprising a plurality of compartments for containing poultry;
   means for transporting a plurality of said wheeled means comprising a fifth wheel trailer having a pair of upper and lower longitudinal frame members, and moveable ramp means for loading and unloading said wheeled means disposed along both longitudinal sides of said trailer and extending between said upper and lower longitudinal frame members;
   said moveable ramp means comprising a plurality of elongated U-shaped guide members hingedly mounted to said lower longitudinal frame members;
   said trailer further including a plurality of channel rails transversely positioned across the bed thereof at spaced locations corresponding to the positions of said guide members for receiving said wheeled means after loading via said guide members; and
   means for latching said plurality of guide members in a substantially vertical position comprising an actuating shaft rotatingly coupled to and extending along each of said upper frame members of said trailer, a plurality of retainer bars connected to said shaft at spaced locations therealong which correspond at least to the position of alternate guide members, and a handle at one end of each of said shafts for rotating same and thereby simultaneously rotating said bars into or out of engagement with at least said alternate guide members.

2. The poultry-handling system as set forth in claim 1, wherein said wheeled means further comprises a main frame having wheels positioned at the four lower corners thereof, and a plurality of vertically stacked individually screened poultry compartments.

3. The poultry-handling system as set forth in claim 2, wherein each of said screened poultry compartments includes a hinged door.

4. The poultry-handling system as set forth in claim 1, wherein said trailer includes a forwardly positioned fifth wheel hitch and a rearwardly positioned horizontal platform means below which the wheels of said trailer are positioned.

* * * * *